Figure 1:
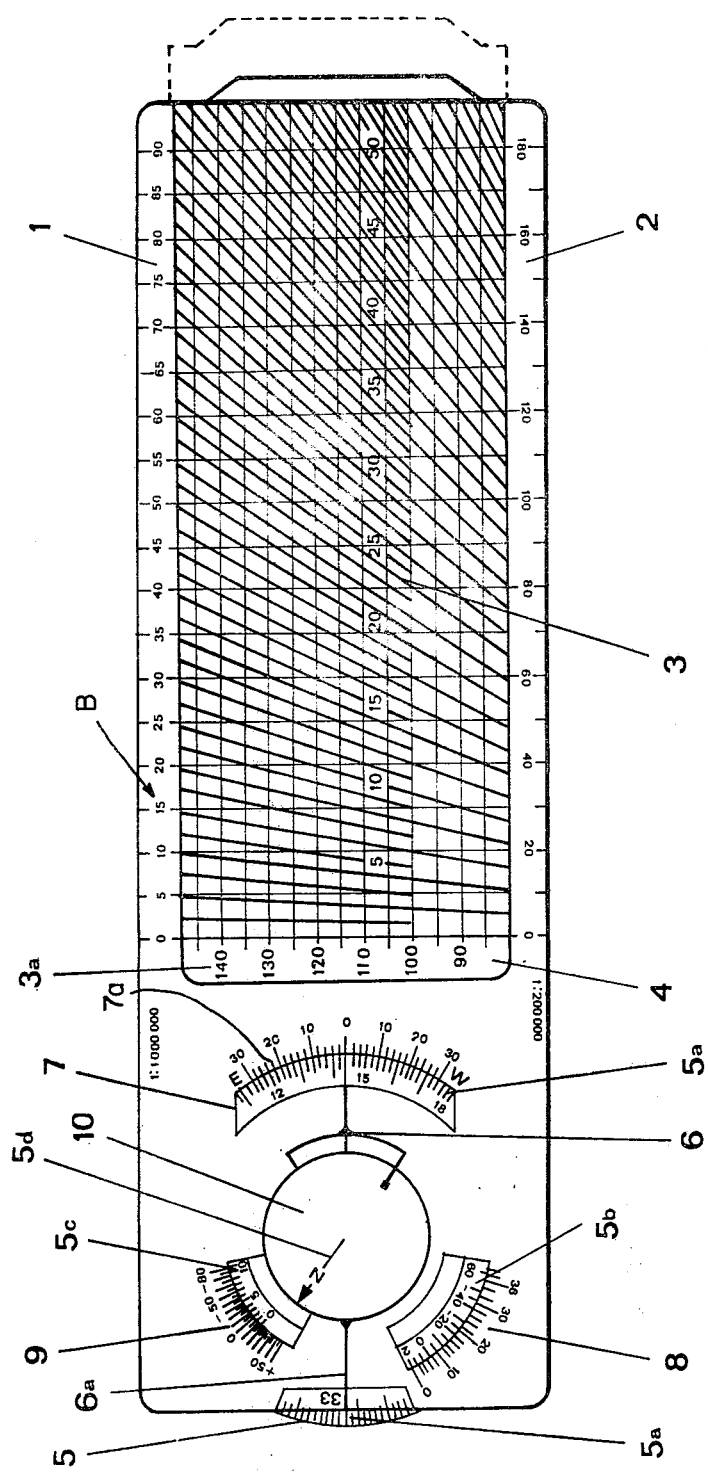

United States Patent [19]

Borgato

[11] 4,120,091
[45] Oct. 17, 1978

[54] DEVICE FOR ESTIMATED AIR NAVIGATION, OBTAINED THROUGH THE COMBINATION OF VARIOUS MEASURING AND CALCULATING INSTRUMENTS

[76] Inventor: Augusto Borgato, Via Casalini 5, Rovigo, Italy, 45100

[21] Appl. No.: 747,157

[22] Filed: Dec. 3, 1976

[30] Foreign Application Priority Data

Dec. 29, 1975 [IT] Italy .............................. 64509 A/75

[51] Int. Cl.² .......................................... G01C 21/20
[52] U.S. Cl. .................................... 33/15 B; 33/1 SD
[58] Field of Search ............... 33/1 SB, 1 SD, 76 VA; 235/61 NV

[56] References Cited

U.S. PATENT DOCUMENTS

| 2,425,097 | 8/1947 | Isom | 33/76 VA |
| 3,361,346 | 1/1968 | Warner | 235/61 NV |
| 3,496,640 | 2/1970 | Warner | 33/1 SD |
| 3,514,582 | 5/1970 | Sanderson | 33/1 SB |
| 3,625,417 | 12/1971 | Slauter | 33/76 VA |
| 3,735,100 | 5/1973 | Wagenfeld | 235/61 NV |

FOREIGN PATENT DOCUMENTS 183,347 7/1922 United Kingdom ............... 33/76 VA

Primary Examiner—Richard E. Aegerter
Assistant Examiner—John W. Shepperd
Attorney, Agent, or Firm—Beveridge, DeGrandi, Kline & Lunsford

[57] ABSTRACT

A single air navigation instrument provides sequential direct readings of true-course, magnetic-course, magnetic-heading, distance and flight times; determines in value and sense the altitude correction corresponding to actual barometric pressure at sea-level, and provides solutions of the wind triangle.

The longitudinal borders of the instrument carry a scalimeter having distance scales graduated in nautical miles. A first rotating goniometer inserted between the upper and lower faces of the instrument protrudes enough to permit its rotation by thumb or finger action. The center of the first goniometer is transparent and carries an arrow visible through windows on both sides of the instrument, permitting the positioning of the instrument directly on navigational charts. The reverse side of the disc carries the inner scale of a circular logarithmic slide-rule.

Chronometric nomographs graduated in minutes are positioned to be visible on the face of the instrument, with the distance graduations of the nomographs being aligned with corresponding distance graduations on the scalimeter scales.

On the reverse side of the instrument, the wind triangle may be solved by use of a polar grating underlying a square slider which has a rotatable transparent second goniometer, having a radial vector graduated in units of the wind's vectorial speed. Directional graduations are located on the slider for use in obtaining the wind impact angle.

13 Claims, 2 Drawing Figures

DEVICE FOR ESTIMATED AIR NAVIGATION, OBTAINED THROUGH THE COMBINATION OF VARIOUS MEASURING AND CALCULATING INSTRUMENTS

At present, for the planning and the control of an estimated air navigation we need three instruments, namely the goniometer, the ruler and the slide rule.

The chronological use of these instruments is easy on the board of large airplanes, where pilots and operators dispose of a comfortable desk and overall of a great freedom of movements.

Mono-place airplanes on the contrary do not dispose of such facilities and the narrow cabin and the cumbersome survival equipment reduce the pilot's freedom of movement to such extent that he finds it extremely difficult to use the normal charting instruments whose handling requires above all a loss of time, which must be subtracted from the demanding exigences of the piloting.

The object of the present industrial invention is a single instrument for the estimated air navigation, obtained by the combination of a scalimetric rule, a rotating goniometer, a circular logarithmic slide rule, a chronometric nomograph and a polar grating with a slide-operated rototranslable goniometer.

The novelty of the finding which constitutes the object of the present invention consists not only of the realization of a single instrument resulting from the combination of several different charting and calculating instruments, but also of the practical realization of:

(1) A rotating goniometer which, besides constituting the inner rotation disc of a circular logarithmic slide rule, allows:
   (a) The direct reading of True Course,
   (b) the direct reading of Inverted True Course,
   (c) the direct reading of Magnetic Course,
   (d) the corrections of altitude in function of the actual barometric pressure at sea level.
(2) A chronometric nomograph graduated in minutes, which by allowing the direct reading of the flight times, suppresses the necessity of using the slide rule to calculate them, as is presently customarily done.
(3) A polar grating with slide-operated rototranslable goniometer, which unlike those existing in the market offers the advantage that it can be operated by the pilot with only one hand, without distracting the other from the pilotage of the aircraft.

Figure 2:
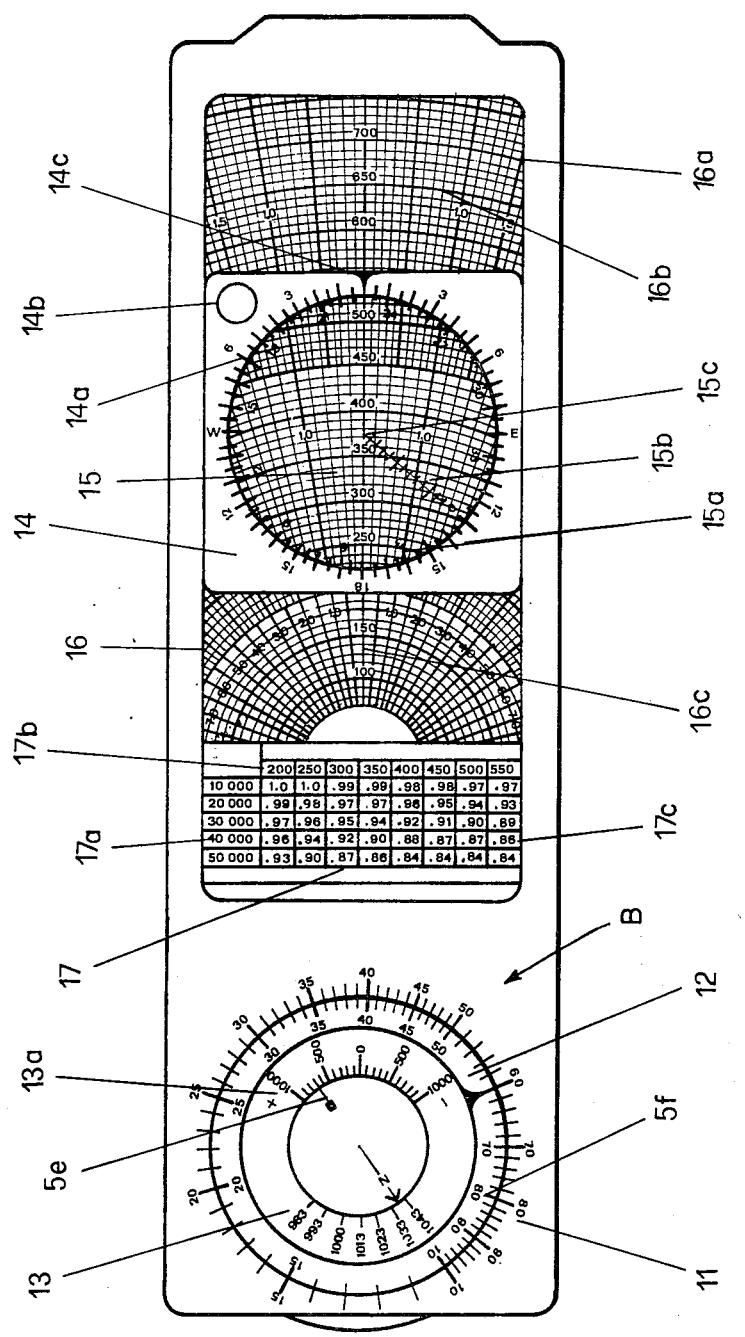

The invention will be better explained in the following detailed description, with reference to a preferred type of realization, illustrated as a non-limiting example in the adjoined tables of drawings, where FIG. 1 represents the front side of the instrument, which comprises the rotating goniometer and the chronometric monograph and FIG. 2 represents the back side of the same instrument, comprising the logarithmic slide rule and the polar grating with the rototranslable goniometer.

In the figures of the adjoined drawings the numerals from 1 to 17c indicate the following elements, all of which are placed or mounted on a common generally rectangular base member B.

1: Longitudinal border of base member B, graduated in nautical miles, which can be used for the direct reading of the distance on a navigation chart of the Lambert type, on a 1:1,000,000 scale.

2: Longitudinal border of base member B, graduated in nautical miles, which can be used for the direct reading of the distance on navigation charts of the Lambert type, on a 1:2,000,000 scale.

3: Chronometric nomograph which can be slided under the transparent separation (4) with the indication of isochronometric curves representing the minutes required to cover the distances measured with the longitudinal borders, 1 or 2, in function of a given speed selected on the scale (3a) and expressed in knots, one knot being equal to one nautical mile per hour.

4: Transparent division plate to house the different interchangeable chronometric monographs, with different ranges of speed and times for covering the distances.

5: Rotating disc spaced inwardly of the longitudinal borders of the base member B and extending outwardly from the end of the base member B, engraved with the following graduations:

5a: Course indicating goniometric graduation on the external border of the front face (FIG. 1) with sexagesimal divisions, from 0° to 360°, which can be used to find the True Course and the Magnetic Course by direct reading, 5b: thermometic graduation from + 50° to − 80° C., to be used for the correction of the altitude in function of the temperature, 5c: altimetric graduation from 0 to 80,000 feet, to be used for the determination of the True Air Speed, 5d: reference arrow marking N, indicating the obliged position of the meridian of the nautical chart, 5e: the same arrow mentioned in 5d, provided with a diametral terminal which, on the back side the instrument (FIG. 2), serves for the correction of the altitude in function of the actual barometric pressure at sea level, 5f: in FIG. 2, indicates the circular logarithmic scale engraved on the back of the rotating disc 5 which serves to effect such arithmetic operations as multiplications, divisions and proportions.

6: Fixed directional index mark in the form of an arrow engraved in the front face of FIG. 1 indicating the direction of the True Course, whose angular value can be read in the underlying circular goniometric graduation 5a.

6a: Reference arrow, diametrally opposed to the arrow 6, for the reading of the supplementary (inverted) course at 180°.

7: Transparent slit bearing on its external border a graduation 7a corresponding to the magnetic declination, comprised from 0° and 30° East and from 0° and 30° West, which has the function to help to find by direct reading the Magnetic Course on the underlying graduation 5a, thus avoiding the customary mental calculation.

8: External border of the transparent slit, marked with altimetrical incisions from 0 to 36,000 feet, to be used in combination with the thermometric graduation 5b for the correction of the altitude in function of the temperature.

9: External border of the transparent slit, graduated from +50° C. to −80° C., to be used in combination with the altimetrical scale 5c for the calculation of the True Air Speed.

10: Transparent circular window, allowing the arrow 5d engraved on the circular disc to be collimated with the direction of the True North.

11: of FIG. 2, represents the stationary scale of the logarithmic circular slide rule, engraved on the external border of the transparent circular band 12 through which the mobile logarithmic scale 5f can be read.

12: Transparent circular band, through which the mobile logarithmic scale can be read.

13: The scale of the actual barometric pressure at sea level, marked from 983 to 1043 millibars.

13a: Altitude correction (in value and sign) corresponding to given units of the scale 13.

14: Slider, allowing the rototranslation of the transparent goniometer 15, composed of:

14a: semi circular graduations from 0° to 180° East and from 0° to 180° West, to be used for ascertaining the angle of wind impact, 14b: groove to facilitate the motion of the slider, 14c: reference index, to be used to define the angle of True Course through the rotation of the transparent goniometer 15.

15: Transparent and rototranslable circular goniometer, to be used in combination with the polar grating 16, for the graphic resolution of the Wind Triangle. It is composed of:

15a: 360° peripheral graduation representing the angles of True Course and the angles of wind's provenance, 15b: radial segment with 10 knots spacings, whose purpose is to represent the vectorial speed of a reference wind directed to the centre 15c, 15c: centre of the goniometer and end of the wind vector. This centre serves, in the graphic resolution of the WIND TRIANGLE, to individuate on the axis of the course 16c the resulting value of the GROUND SPEED.

16: Polar grating, to be used in combination with the rototranslable goniometer 15 for the graphic resolution of the WIND TRIANGLE. It is composed of:

16a: a bundle of concentric half-lines, at angles of 1°, 2° and 5°, which represent angles of drift correction, 16b: Series of arcs of circle, equidistanced by 10 knots, whose centres coincide with the pole of the bundles of half-lines, whose readings individuates on the half-lines the TRUE AIR SPEED, and on the axis of the course 16c the GROUND SPEED.

16c: Axis of the course (polar axis of the gratings) indicating a range of ground speeds, which in the example illustrated in FIG. 2, is located between 70 and 750 knots.

In the graphic resolution of the WIND TRIANGLE the axis is, of course, in combination with the centre 15c, gives the ground speed.

17: Chart, to be used for the determination of the equivalent air speed, comprising:

17a: range of barometric altitudes from 10,000 to 50,000 feet,

17b: range of speeds, calibrated from 200 to 550 knots,

17c: coefficient of correction, allowing for the compressibilty of the air.

Before illustrating the practical working of the invention, we deem it convenient to recall the operations which are needed to determine the following navigation elements:

(1) COURSE: graphic representation of a course by drawing on a nautical chart a line joining the starting with the arrival points;

(2) TRUE COURSE: angle defining, in sexagesimal degrees, the course's direction with respect to a fixed reference axis oriented towards the geographic North Pole, represented on the navigation chart of the meridians.

(3) MAGNETIC COURSE: angle defining the direction of the course with respect to the magnetic North Pole, which is displaced — as is well known — from the geographical North Pole by the angular value of the magnetic declination.

We remind that in the majority of the aircrafts the compass still remains the principal instrument for the indication of the course, which obviously will be a magnetic course.

(4) DISTANCE - Linear measurement of the course, expressed in nautical miles (1 nautical mile = m 1852).

(5) TIME OF FLIGHT - Distance expressed in minutes and calculated in function of a given speed of the aircraft.

The elements of flight named above are usually determined with the following procedure:

(a) Course, True Course and Distance: with the use of a goniometer and a ruler;

(b) Magnetic Course: this is calculated mentally by the pilot with the algebric addition: Magnetic Course = True Course − (± declination). (c) Time of flight: is calculated by the well known formula: Time = Distance/Speed, with the use of the slide rule.

The above procedures implicate:

(a) the use of three different instruments: goniometer, ruler and slide rule, (b) a mental calculation (the magnetic course), (c) the calculation of the time of flight with the slide-rule, (d) the disposition of a wide freedom of movements (otherwise scarcely available in the narrow cabins of mono-place aircrafts), (e) the immediate recording of the data thus obtained, to avoid possible oversights resulting from the separate handling of three different instruments.

We will now proceed to describe the working way of the invention, to demonstrate how its use can overcome the inconveniences mentioned above.

Referring to FIG. 1, after setting the scalimeter's border 1 with the course by placing the beginning point of the scale on the starting point, rotate the disc 5 until the arrow 5d will fall in line over the local meridian of the nautical chart, with the pointer oriented towards North.

In correspondence with the direction pointer 6, read on the goniometric graduation 5a the value in degrees of the True Course. Then, in opposition to the local magnetic declination selected on the external border of 7, read on 5a the value in degrees of the magnetic course.

Keeping the instrument in this position, corresponding to the point of arrival, read on the scalimeter the distance of the course, expressed in nautical miles. Then lower - ideally or materially - a vertical line from the point of arrival, until this line meets with the horizontal line corresponding to the aircraft's speed, chosen on 3a.

The point where the two lines meet will intercept, on the nomograph, an isochronometric line indicating, in minutes, the time of flight between the two points of the course.

It is an object of the present industrial invention the combination of a rotating goniometer, a scalimeter and a chronometric nomograph in such a way as to make it possible to represent in a panoramic vision the chronological sequence of a flight program whose parameters are determined by direct reading.

This has been accomplished to the end of supplying the pilot with an instrument which is not only handy and extremely practical, but which offers in addition the following advantage:

(1) - Elimination of two instruments: the ruler and the goniometer,
(2) - Elimination of the mental calculation of the magnetic course,
(3) - Elimination of the use of the slide to calculate the time of flight,
(4) - Easy handling even in restricted spaces.
(5) - Memorization of the data obtained, made easier by the panoramic and chronologic representation of the same.
(6) - Remarkable speed of calculation.

Apart from the novelty of the invention as described in the title, the finding differentiates itself from the usual navigation rulers actually in commerce for a different formulation and solution of several other navigational problems, such as, for instance:
(a) The calculation of the Right Altitude,
(b) The calculation of the True Altitude.
(c) The calculation of the Equivalent Speed.
(d) The calculation of the True Speed.

Before exposing the procedure for the calculation of the above mentioned terms, it will be convenient to remind that those instruments, like the altimeter and the anemometer, which work with an aneroid capsule, are calibrated with reference to standard air and to the following conditions: 45° Latitude, Dry air, +15° C. Temperature at sea level, −2° C./1000 Vertical Thermal gradient, 1013.32 millibars barometric pressure at sea level, 1 millibar/27 feet Vertical Baric Gradient.

Every time the instruments are exposed to air with physical characteristics other than standard air, they will give erroneous indications: to correct them it is necessary the use of the slide rule.

We start by correcting the indications of the altimeter, first in function of the temperature (obtained by the thermometer on board or from the meteorological bulletin received by radio) and successively in function of the actual barometric pressure at sea level. The first operation is effected on the window 8 by rotating the disc 5 until the external temperature, engraved on the graduation 5b, will be in coincidence with the programmed altitude of flight, chosen on the external border of said window.

This rotation is transmitted directly to the mobile logarithmic scale 5f of FIG. 2 which, by displacing itself angularly by the logarithm of the thermometric coefficient, will effect a multiplication whose result (corrected altitude) can be read on the stationary scale 11 in correspondence with the indicated altitude, located on the mobile scale 5f. Then we go on by determining the True Altitude, that is the altitude obtained formerly but which must be furtherly corrected in function of the barometric pressure at sea level.

The operation consists of adding algebrically to the corrected altitude the value expressed in feet on the scale 13a and indicated by the arrow 5d when its diametral terminal 5e is set in coincidence with a given value — in millibar — of the actual barometric pressure at sea level, indicated in the graduation 13.

It is an object of the present invention a device which corrects the altitude in function of the actual barometric pressure at sea level: we have thus obtained the result of eliminating the mathematical calculation effected with the still used formula Ch = (actual barometric pressure - 1013.32) 27.

After concluding with the subject "altitude" we will go on to deal with the part concerning speeds. In the technical aeronautical language we distinguish five different speeds:

1. Indicated air speed = instrumental speed in standard air.
2. Calibrated air speed = as above, but corrected for the error deriving from the position of the static intakes.
3. Equivalent air speed = calibrated speed corrected for the error introduced by the compressibility of the air in the Pitot's tube.
4. True air speed = equivalent speed corrected in function of altitude and temperature.
5. Ground speed = true air speed modified by the wind's effect; in the absence of wind, ground speed is equal to True air speed.

Whilst the first two speeds are determined by the aircraft's performance charts, the third, fourth and fifth ones are calculated with the slide rule as follows:

EQUIVALENT AIR SPEED: referring to FIG. 2, entering in the chart 17 with the programmed-flight altitude 17a and the calibrated speed of the aircraft 17b we obtain the coefficient of correction for the compressibility 17c. Then with the slide rule 5f and 11 we obtain the product of the calibrated speed times the coefficient of compressibility, thus obtaining the equivalent speed.

TRUE AIR SPEED: with reference to FIG. 1, rotate the disc 5 until the value of the true altitude — chosen on the altimetric graduation 5c — faces the known value of the external temperature, chosen on the thermometric graduation 9.

This rotation will be transmitted directly to the mobile logarithmic scale 5f of FIG. 2 and this, by displacing itself angularly by the value of the logarithm of the global correction coefficient (thermologic and altimetric), will effect the operation:

Equivalent air speed x coefficient of global correction = True air speed, whose value will be read on the stationary logarithmic scale 11, in correspondence with the value of the equivalent air speed located on the mobile scale 5f.

GROUND SPEED AND CORRECTION OF DRIFT: these two parameters of the estimated air navigation must be known only and exclusively when the aircraft flies in the presence of wind. They are calculated through the solution of the so called WIND'S TRIANGLE, whose known terms are:

True air speed (first side of the triangle)
(b) Wind impact angle (angle opposed to the first side)
(c) Wind speed (second side of the triangle) while the unknown terms are:
(d) Angle of drift correction (opposed to the second side)
(e) Ground speed (third side of the triangle).

These unknown values are usually determined graphically, by effecting the vectorial composition of the air speed and the wind speed (by the analytical procedure, they are instead determined trigonometrically).

The graphic procedure is the one generally preferred, since it gives a speedier solution of the wind triangle, which is obtained with portable instruments consisting of a rotating and transparent goniometer over which there will be drawn with a pencil a radial segment representing the wind's vectorial speed: the goniometer works in combination with a polar grating engraved on a strip which slides under it.

Said grating is composed of a polar axis (course's axis) and of a bundle of concentric half-lines at intervals of 1°, 2° and 5° (sexagesimal) from one another and representing angles of drift correction.

The bundle of half-lines and the polar axis are intersected by a series of concentric circular arcs at the unitary distance of 10 knots from each other, whose radius individuates on the half-lines the true air speed and, on the course's axis, the ground speed.

The practical use of said known instruments is divided in three stages: drawing of the vector "wind", positioning of the true course and vectorial composition.

Drawing of the vector wind: this is done by rotating the goniometer until the angle of the wind's direction is in line with the course's axis (polar axis of the grating); successively with a pencil of the type for writing on glass, we will draw from the centre of the goniometer a radial segment whose length be equal to the speed of the wind and which be readable on the course's axis by using as a measuring unit the graduation in knots engraved on the same axis.

Positioning of the true course: this is done by rotating the goniometer until the true course coincides with the course's axis.

Vectorial composition: this is effected by sliding the polar grating under the goniometer until the radial end of the "wind" vector and the arc of circle corresponding to the air speed of the aircraft meet.

By this operation we intercept one of the half-lines of the grating, which represents, in degrees, the angle of drift correction and its sign (+ if it is on the right hand side of the course, − if it is on the left side).

Finally the centre of the goniometer will individuate on the course's axis the resulting value of the ground speed.

Aside from the principle of the graphic solution of the usual wind triangle and the well known rulers, the novelty of the present invention resides in the realization of a slider 14 allowing the rototranslation of a transparent goniometer 15 bearing the radial engraving 15b representing the wind's vectorial speed divided into units of 10 knots.

This has been realized with the purpose of doing without the necessity of drawing the "wind" vector and the sliding of the polar grating, since these operations, requiring the use of both hands, oblige the pilot to abandon the controls of the aircraft for the time necessary to effect the graphic solution of the wind's triangle.

The ensemble SLIDER - GONIOMETER in our case operates as follows:
(1) Positioning of the true course and finding the impact angle
(2) Alignment
(3) Vectorial composition.

POSITIONING OF THE TRUE COURSE AND FINDING THE IMPACT ANGLE: the posizioning of the true course and the finding of the impact angle are effected by rotating the transparent goniometer 15 until the angle of true course read on the graduation 15a is placed against the course's index 14c; successively, in the correspondence with the angle of the wind's direction, as read in 15a, it is possible to individuate on the graduation 14a the angle of wind's impact.

ALIGNMENT - This is obtained by rotating the goniometer 15 until the vector wind 15b coincides with the impact angle formerly ascertained.

VECTORIAL COMPOSITION - This is realized by displacing the slider as far as to position a part of the vector 15b — whose length corresponds to the wind's speed - on the arc of circle corresponding to the true air speed of the aircraft.

This operation will intercept one of the half-lines of the grating representing in degrees the drift's correction angle and its sign, while the centre of the goniometer will individuate on the course's axis the resulting value of the ground speed.

Of course the invention can be realized in various materializations, both for its eventual practical application in the maritime navigation and as regards the dimensions and the materials employed and for the scales of representation of the different nautical parameters, the scales for the reduction of the distances and the ranges of the speeds and of the running times of the chronometric nomograph, which can obviously also represent, in the place of speed in miles per hour, the hourly consumption of fuel, with the logical consequence that on the times' scales there will be read minutes of self-sufficiency of flight if the distance scale is used to indicate the quantity of fuel present in the reservoirs.

Therefore there will be comprised within the range of the present invention all those instruments for the estimated air navigation obtained by the combination of a scalimetric ruler, a slide rule, a rotating goniometer, a chronometric nomograph and a goniometer rototranslable through a slider, as substantally described, illustrated and claimed as follows.

I claim:

1. Instrument for estimated air navigation comprising a base member, scalimetric rulers extending along two parallel longitudinal borders of said base member, a rotatable member located on said base member inwardly of said longitudinal borders, a circular logarithmic slide rule having a first scale on said base member and a second scale on said rotatable member, a first goniometer connected to the rotatable member of said slide rule and having a marking which is alignable with meridians on a chart, an index mark on said base adjacent to said first goniometer, said first goniometer having course-indicating markings adjacent to and alignable with said index mark, said first goniometer being transparent and rotatable with the rotatable member to align the marking with meridians on a chart, a chronometric nomograph on said base member in spaced relation to said first goniometer, a polar grating on said base member, a slider mounted on said base member for translatory movement thereon and a second goniometer supported by and rotatable on said slider, said second goniometer being transparent and having scales thereon overlying said polar grating.

2. Instrument for the estimated air navigation as in claim 1, wherein the second goniometer is provided with a radial engraving divided into units of 10 knots, representing the wind's vectorial speed.

3. Instrument for the estimated air navigation as claimed in claim 1 wherein the first goniometer is provided with central transparent area, first graduation means in units of sea level barometric pressure alignable with said marking on said first goniometer, and second graduation means on the perimetral border of said first goniometer for providing the algebraic correction of altitude corresponding to the actual barometric pressure at sea level.

4. Instrument for the estimated air navigation as claimed in claim 1, wherein said chronometric nomograph includes a bundle of isochronometric lines marked in minutes, referred to a cartesian grating whose abscissa is the distance in nautical miles and whose ordinate is the ground speed of the aircraft, expressed in knots or miles per hour.

5. The instrument of claim 1 wherein the scalimeter is adjacent to said nomograph and has distance graduations thereon, said nomograph having distance graduations aligned with said distance graduations on the scalimeter to enable direct reading of time of flight for distances indicated by said scalimeter.

6. The instrument of claim 1 wherein the slider is provided with perimetral directional graduations, the slider is non-rotatable and the second goniometer is provided with perimetral directional graduations alignable with said graduations on the slider to enable the instrument to give direct readings of the wind impact angle.

7. The instrument of claim 6 wherein the scalimeter is adjacent to said nomograph and has distance graduations thereon, said nomograph having distance graduations aligned with said distance graduations on the scalimeter to enable direct reading of time of flight for distances indicated by said scalimeter.

8. Instrument for the estimated air navigation as in claim 6, wherein the second goniometer is provided with a radial engraving divided into units of 10 knots, representing the wind's vectorial speed.

9. The instrument of claim 8 wherein the scalimeter is adjacent to said nomograph and has distance graduations thereon, said nomograph having distance graduations aligned with said distance graduations on the scalimeter to enable direct reading of time of flight for distances indicated by said scalimeter.

10. A navigational instrument operable when placed on a navigational chart, said instrument comprising, a base having parallel longitudinal borders,
an index mark on said base,
a scalimeter on said base having distance-indicating markings disposed along said longitudinal borders,
a nomograph on said base having distance-indicating markings aligned with said distance indicating markings of said scalimeter,
a goniometer rotatable on said base and having course-indicating markings adjacent to and alignable with said index mark, said goniometer being spaced inwardly from the longitudinal edges of said scalimeter so as not to obstruct the longitudinal borders of the scalimeter, said gomiometer being spaced longitudinally from the nomograph, and having a transparent central portion provided with an arrow for alignment with meridians on said chart,
said arrow, said scalimeter and said nomograph being located for simultaneous viewing to enable an operator to place said instrument on a navigational chart, align said scalimeter with the course to be followed, ascertain the distance of travel from the scalimeter, read the nomograph graduations aligned with the distance-indicating markings for direct reading of the time of flight, and rotate the goniometer to align the arrow with meridians on said chart whereby the true course is shown by said course-indicating markings.

11. The instrument of claim 10 wherein the base is provided with declination-indicating graduations adjacent to said course-indicating markings.

12. The instrument of claim 10 wherein said goniometer extends outwardly from the end of said base member.

13. The instrument of claim 10 having a circular slide rule including a stationary logarithmic scale and a mobile logarithmic scale, said mobile scale being located on the opposite side of said goniometer from said course-indicating markings.

* * * * *